Inventors,
Sidney Walter Gough,
James Anthony Morgan

United States Patent Office 2,869,362
Patented Jan. 20, 1959

2,869,362

MACHINES FOR TESTING PNEUMATIC TIRES

Sidney Walter Gough, Sutton Coldfield, and James Anthony Morgan, Ward End, Birmingham, England, assignors, by mesne assignments, to Dunlop Tire and Rubber Corporation, Buffalo, N. Y., a corporation of New York Application July 6, 1955, Serial No. 520,292

Claims priority, application Great Britain July 8, 1954

6 Claims. (Cl. 73—146)

Our invention relates to apparatus for testing pneumatic tire casing, more particularly to examining and evaluating the phenomenon of "tire thump," that is, the sound effect resulting from a change in the radial stiffness of the casing.

A tire casing is known in the art as that part of a pneumatic tire assembly which usually comprises a bead reinforced carcass having a superposed breaker and tread. It does not include or comprise an inner tube. The phenomenon of "tire thump," is due to a change in the radial stiffness of the casing and the invention therefore relates only to the examination of the casing as to its suitability for quiet running both to enable the casing to be graded and to ascertain the location and cause of a casing defect giving rise to a "tire thump."

In our invention the tire is rotated on a smooth surface, such as a smooth road surface or, in factory testing, on the smooth peripheral surface of a drum and the vibration or noise of the tire is transmitted mechanically as through a supporting means such as a shaft or a beam to an acoustic chamber or box from which the sound vibration of the "thump" is amplified and detected or recorded. The transmission from the tire to the acoustic box, such as a supporting beam, is light and rigid so as to have a low inertia and is provided with means to dampen its natural oscillations thereby sharpening the thump pulse. The acoustic box is insulated to absorb minor vibrations and a microphone is mounted in it to detect the thump vibrations.

A current or potential set up by the microphone is transmitted to a suitable amplifying current. The offtake from the amplifier is then rectified to a smooth direct current in which the position and amplitude of the thump are indicated by suitable visual or recording means. The mounting of the wheel and smoothness of the running surface in contact with the wheel being tested are such as to avoid vibration and noise other than that of the "thump."

Figure 1:
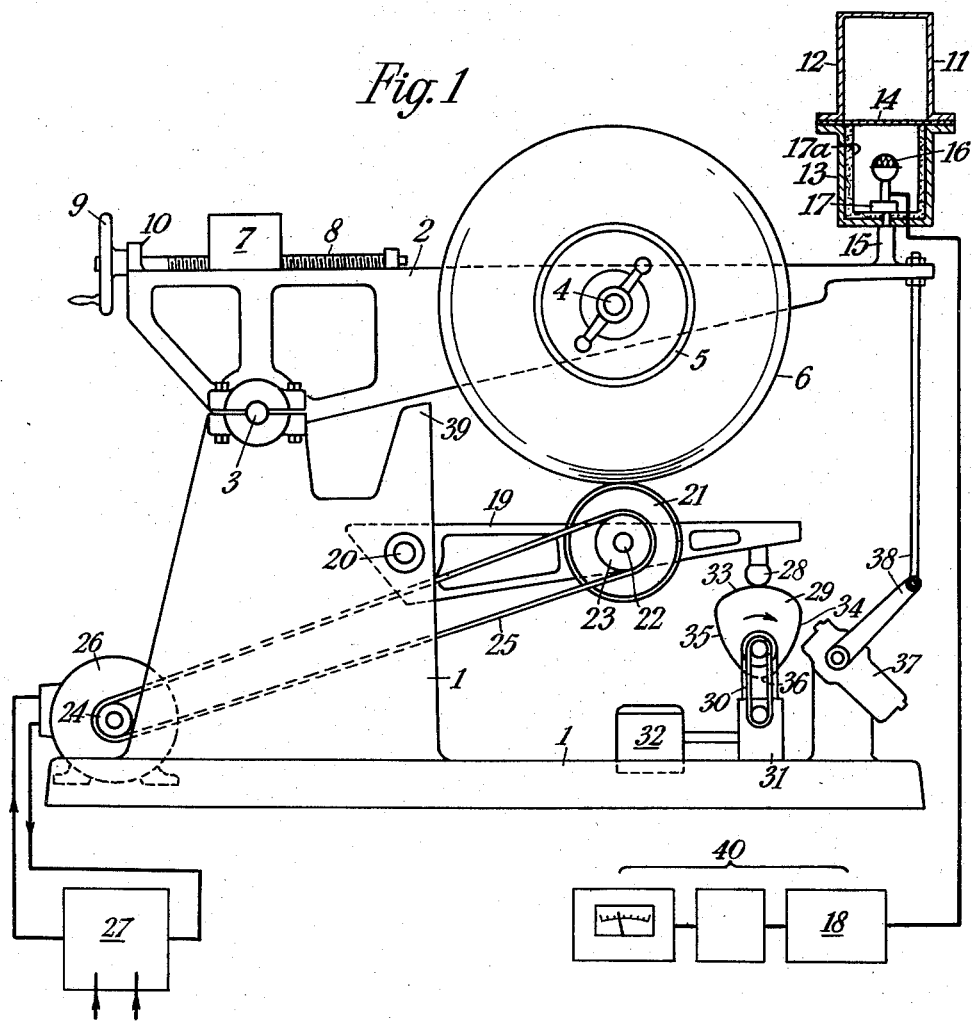
Figure 2:
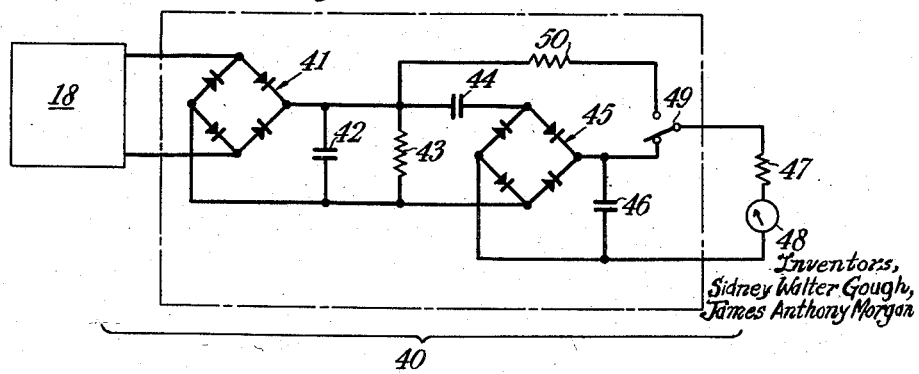

One embodiment of the invention is decsribed with reference to the accompanying drawings in which:

Figure 1 is a diagrammatic side elevational view, partly in cross-section, of an apparatus according to the invention, and Figure 2 shows an electric circuit of an indicating unit for the apparatus shown in Figure 1.

The apparatus shown in Figure 1 comprises a frame 1 upon which a light, rigid metal beam 2 is supported by means of a pivot 3. The beam 2 is provided with an axle 4 carrying a wheel 5 and a tyre casing 6 to be tested.

An internally threaded weight 7 movable longitudinally of the beam by means of the lead-screw 8 and the handwheel 9 held against axial displacement in bearings 10 on the frame 1 is provided for adjusting the load on the casing 6 as will be more particularly described later in the specification. A damper 37, in the form of a motor car shock absorber, is connected to one end of the beam 2 by means of the linkage 38.

An acoustic box 11 is formed in two hollow 10 inch diameter cylindrical halves 12 and 13, each half having a closed end and the halves being divided by means of a diaphragm 14 of thinner material than that of the box 11 itself. The box is rigidly supported on the beam 2 by means of a supporting post 15 and a microphone 16 is supported in the bottom half 13 on a resilient rubber antishock mounting 17 to prevent the direct transmission to the microphone of mechanical shock and vibration effects. The microphone is of the crystal type and has, with the amplifier 18, to which it is connected a high stability and flat frequency response from say 20 C. P. S. to 500 C. P. S. The bottom half 13 of the box 11 is lined with sound absorbing material 17a such as rubber or fibre glass.

The acoustic box operates so that vibrations transmitted thereto through the supporting post 15 cause the air within the box to vibrate resonantly in response to a sudden change in the amplitude of a vibration, i. e., a vibration set up by a tire thump. Damping of the vibration is effected by the application of sufficient sound absorbing material to the internal walls of the box to damp the resonance but to preserve the thump vibrations and a diaphragm located within the box may be provided, the said diaphragm being capable of damped vibration in response to the said sudden change of amplitude. In an alternative arrangement, the walls of the box operate after the manner of, and replace, the diaphragm. The acoustic box simulates a car body.

The microphone 16 is not a commercial pick-up but is for the purpose of detecting sound vibrations which are then transformed or transduced into very faint electric currents which are then amplified.

An arm 19 pivotally mounted at one end on a pin 20 carries a driving drum 21 having a hard and smooth outer peripheral surface. The drum 21 is carried on a shaft 22 which has a pulley 23 rigidly keyed to one end. The pulley 23 is drivably connected to a pulley 24 by means of a belt 25, the pulley 24 being rigidly keyed to the shaft of an electric motor 26 mounted on the frame 1 and supplied through a motor speed controller 27 capable of varying the speed at which the motor drives the cover over the range 1 rev. per sec. to 3 revs. per second corresponding to a vehicle speed of 5 to 15 M. P. H.

The arm 19 is provided with a cam follower 28 which engages the actuating surface of a cam 29 driven through a belt 30 and gear box 31 by means of an electric motor 32. The cam is provided with a lift portion 33, raising and lowering portions 34 and 35 respectively, and a dwell portion 36, rotation of the cam causing a raising or lowering of the arm 19 which causes the drum 21 to lift the casing 6 and thus the pivoted beam 2 until the beam is raised into the position shown in Figure 1 from a fixed position wherein it is supported on the abutment 39 provided on the frame 1.

The amplifier 18, connected to the microphone 16 and forming part of a measuring unit 40, is of straight-forward and conventional design, its output being fed to the remainder of the indicating unit 40 now to be described with reference to Figure 2.

The amplifier output is connected across a full wave rectifier 41 smoothed in known manner by means of a parallel connected condenser 42 and resistance 43. The resulting wave-form is unsuitable for operating a meter since the variations in the D. C. voltage would not be followed by a meter needle and, in any case, a steady reading is desirable. A condenser 44 is therefore connected in series with an output lead of the rectifier 41 and the output of the latter is then connected to a second full-wave rectifier 45. The full-wave rectifier 45 is smoothed by means of the parallel-connected condenser 46 and the resistance 47 and by the resistance of the meter 48 which are connected across the output of the rectifier 45 through a change-over switch 49 which is provided to connect the meter 48 either to the said output or alternatively to connect it through a series resistance 50 to an output lead of the first rectifier 41. The switch is utilised to check, by means of meter 48, the output of the first rectifier, the switch normally being positioned as shown in Figure 2. The smoothed output from the second rectifier is indicated on the meter by a substantially steady reading.

The operation of the apparatus just described will now be outlined. The wheel 5 and an uninflated casing 6 to be tested are mounted on the axle 4 carried by the beam 2. The motor 32 is then started to rotate the cam 29 until the follower and arm are raised into the position shown in Figure 1 with the drum 21 supporting the casing, beam and attachments. The weight 7 is then moved along the beam so that the casing is subjected to a predetermined deflection. The motor 26 is started and the drum 21 driven initially at the upper end of its speed range. The motor speed is then reduced by means of the controller 27 to rotate the casing over the whole of the speed range. The thump effect developed by the rotation of the casing upon the surface of the drum sets up impulses which are transmitted by the beam 2 through the supporting post 15 to the acoustic box 11 and the enclosed diaphragm 14, the vibrations from which are detected by the microphone 16 and the microphone output passed to the indicating unit 40 by means of which the output is amplified, rectified and indicated by a substantially steady reading on the meter 48.

Advantageously, the slow lowering of the casing is effected by a cam which effects a quick lift at the end of the test. The complete test may be effected very quickly, say in 20 seconds, excluding the time for applying the casing to the wheel fitment on the beam. To shorten the complete testing cycle, the wheel may be completely removable from the axle on the beam, when matched wheels provide for one to be fitted with a casing while another carries a casing undergoing test. The wheel may be a two-piece assembly with a quickly-operated clamp for securing it to the casing.

According to a further feature of the invention, a signalling unit is provided, with two signals, one operated when the peak value of a thump falls below a predetermined limit, and the other when it exceeds this limit. The unit may be arranged to operate so that in a borderline case, one of the signals (preferably the first mentioned above) operates intermittently, or a separate signal may be provided for this purpose. Lights are preferably used as the signals. The signalling unit may be automatically switched in by operation of the device that lowers the casing into contact with the drum.

According to yet another feature of the invention a stroboscope is provided to assist in locating the cause of the thump. A flash tube may be arranged to be fired by the maximum output from the amplifier developed at the peak of the thump sound wave, with its input adjusted until it fires once only for each revolution of the cover when the tire speed is set to give maximum thump. The tube is directed to a point on the casing close to its position of contact with the drum, and thus enables one of a series of marks, provided on the wheel carrying the tire, to be noted as lying near the localised change of stiffness. This enables tires to be inspected for the cause of the stiffness change, particularly those giving rise to thumps of greater magnitude than desired.

Having now described our invention—what we claim is:

1. Apparatus for detecting and indicating "tire thump" comprising a rotatably mounted support for a tire casing, a loaded rigid beam engaging and moving with said rotatably mounted support, a rotatable drum having a hard smooth outer surface engageable with the thread of a tire casing mounted on said support, an acoustic box mechanically connected to the beam, a microphone within the box to detect "tire thump" sounds transmitted by the beam to the box and generated by movements arising from rotation of the casing in engagement with the drum surface, and an indicating unit responsive to the said sounds and including an amplifier and a circuit for indicating the thump effect.

2. Apparatus according to claim 1 wherein the circuit for indicating the thump effect comprises a full-wave rectifier connected to the amplifier output, a smoothing circuit connected to said rectifier, a series-connected condenser in one output lead from said rectifier and said smoothing circuit, a second full wave rectifier connected across the output from said rectifier, smoothing circuit and series-connected condenser, a second smoothing circuit connected across the output of said second full-wave rectifier and a meter connected across the output of said second smoothing circuit.

3. Apparatus according to claim 1 having a damper operatively connected at one end to the beam.

4. Apparatus according to claim 1 wherein the acoustic box has a diaphragm mounted within the box and attached by its edges thereto and wherein some of the inside faces of the acoustic box are lined with a sound absorbing material.

5. Apparatus according to claim 1 comprising a frame, an arm carrying the driving drum and pivotally mounted on the frame in position to move the drum towards and away from a tire casing supported on the beam and means for moving the arm from a fixed position into supporting position relative to the casing.

6. Apparatus for detecting and indicating casing "tire thump" comprising a support for a loaded tire casing comprising a rigid beam pivotally mounted adjacent to one end, an axle mounted on the beam parallel to the pivotal axis thereof, a wheel to carry a tire casing rotatably mounted on the axle, a driving drum for the tire rotatably mounted on an axis parallel to the pivotal axis of the beam and having a hard, smooth, outer peripheral surface, means for rotating the drum, means attached to the beam for loading the casing into contact with the drum, an acoustic box mechanically connected to said support, a microphone mounted within the box to detect sound vibrations transmitted by said support to said box and an indicating unit responsive to the sounds detected by the microphone and generated in the box by movements arising from rotation of the casing in contact with said drum, the indicating unit including an amplifier and a circuit for indicating the thump effect.

References Cited in the file of this patent

UNITED STATES PATENTS

| 1,490,899 | Scott | Apr. 15, 1924 |
| 1,809,860 | Midgley | June 16, 1931 |
| 1,830,237 | Morse | Nov. 3, 1931 |
| 1,961,726 | Abbott | June 5, 1934 |
| 2,174,176 | Journeaux et al. | Sept. 23, 1936 |
| 2,532,749 | Aurand et al. | Dec. 5, 1950 |
| 2,695,520 | Karsai | Nov. 30, 1954 |
| 2,735,292 | Apps | Feb. 21, 1956 |

FOREIGN PATENTS

| 315,392 | Great Britain | Aug. 25, 1930 |
| 617,402 | Great Britain | Feb. 4, 1949 |

OTHER REFERENCES

Electronics, Nov. 1950, vol. 23 No. 11, pages 84–87. Tire Tread Noise Analizer, S. A. Lippman et al.